United States Patent [19]

Escola Gallart et al.

[11] Patent Number: 4,952,417
[45] Date of Patent: Aug. 28, 1990

[54] APPARATUS FOR INCORPORATING GAS INTO A SUGAR MASS

[76] Inventors: Ramon Escola Gallart, c/Sebastian Altet No. 6, Sant Cugat del Valles, (08190) Barcelona; Ramon Bayes Turull, c/Urgell 249.80.20, 08036 Barcelona, both of Spain

[21] Appl. No.: 326,287

[22] Filed: Mar. 20, 1989

Related U.S. Application Data

[62] Division of Ser. No. 12,549, Feb. 9, 1987, Pat. No. 4,837,039.

[51] Int. Cl.$^5$ .................................................. A23G 3/00
[52] U.S. Cl. .................................... 426/572; 426/474; 426/477; 425/4 R; 425/817 R; 425/552
[58] Field of Search ............... 426/572, 474, 477, 660; 425/4 R, 552; 264/328, 61, DIG. 83

[56] References Cited

U.S. PATENT DOCUMENTS

| 3,985,910 | 10/1976 | Kirkpatrick | 426/474 |
| 4,104,412 | 8/1978 | Fischer | 426/572 |
| 4,140,736 | 2/1979 | Nielson et al. | 426/474 |
| 4,238,511 | 12/1980 | Egritier | 426/474 |
| 4,272,558 | 6/1981 | Bouette | 426/660 |
| 4,273,793 | 6/1981 | Fariel | 425/4 R |
| 4,282,263 | 8/1981 | Barnes | 426/477 |

FOREIGN PATENT DOCUMENTS 480775 1/1980 Spain .
2048643 12/1980 United Kingdom .

Primary Examiner—Jeanette Hunter
Attorney, Agent, or Firm—P. C. Benasutti

[57] ABSTRACT

An apparatus for incorporating gas under pressure into a fused sugar mass, said vessel having an interior oriented to have top region and a bottom region an agitator in said interior and a bubble forming means for introducing compressed gas into said fused sugar mass as a curtain of gas bubbles, said bubble forming means being in the bottom of the pressure vessel below said agitator.

12 Claims, 3 Drawing Sheets

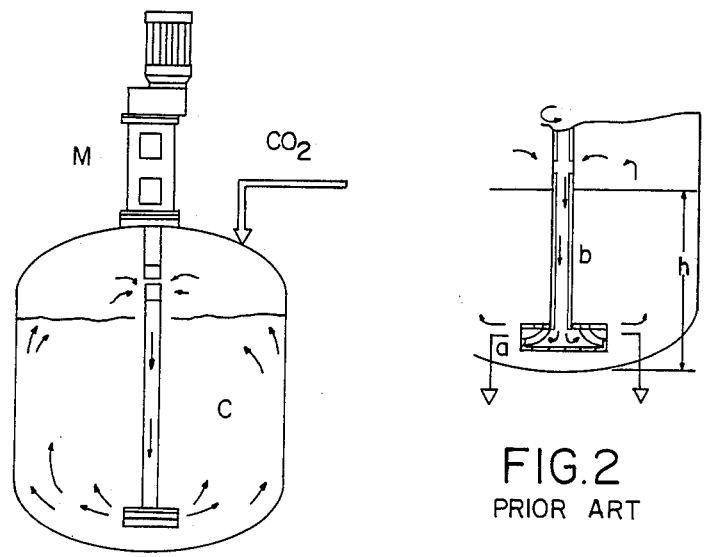
FIG.1
PRIOR ART
FIG.2
PRIOR ART
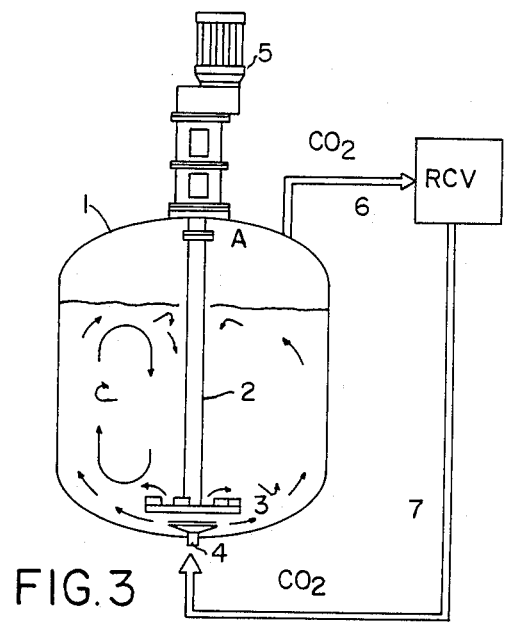
FIG.3

APPARATUS FOR INCORPORATING GAS INTO A SUGAR MASS

This is a divisional of co-pending application Ser. No. 07/012,549 filed on Feb. 9, 1987 now U.S. Pat. No. 4,837,039.

The present invention relates to a new method for gasifying a fused sugar mass. More precisely, the present invention relates to a process of gasification through incorporation of the gas enclosed in the headspace of a pressure vessel and recirculation of same through a hot sugar melt, equalization of the size of the bubbles and their homogenization. The incorporation of the gas is effected at the lower part of the pressure vessel just below the agitator. Undesirably large sized bubbles as well as the presence of an undesirable quantity of candy dust in finished product, showing a bubble diameter inferior to 1 mm and thus not desirable, are avoided by means of the present invention. The quantity of waste product, such as candy dust, thus will range only between 15–20% instead of the usual 30–35% produced in previous methods. Moreover, this technique allows operation at the most convenient pressure. The incorporation of gases into a liquid mass at room temperature or into a mass that is liquid at temperatures superior to room temperature, such as hydrogenation of waxes, long chain hydrocarbons etc. have been objects of thorough studies due to their technological interest. Very complete studies are available with respect to the incorporation of a gas into a liquid phase and with respect to the influence of the parameters upon the mechanism of action (Kymar and Kuloor. Advanced Chemical Engineering, 8,255-386, 1970). Also, studies and patents describing the incorporation of a gas into a mass of fused sugars are available; the incorporation of the mentioned gas is always carried out when the mass is in a pasty or liquid phase. The characteristics of a finished product are determined by the substance or body of the mass after cooling. Bubbles are formed by occluded gas or air. A bubble is a gas globe covered by a thin wall of liquid. This thin layer of liquid hardens upon cooling and will retain therein gas occluded under pressure. The term bubble is also employed herein to denote the empty spaces inside the solid mass.

In cases where the candy mass has a relatively soft substance or body having a low density, the occluded gas or bubbles will form a spongy aerated candy known as marshmallow, U.S. Pat. No. 2,600,596 and 2,082,313.

If the candy mass, after the cooling process, has sufficient body to retain occluded gas, the bubbles will break with a very characteristic crackling sound upon liberation of the gas by action of humidity or moisture. U.S. Pat. No. 3,012,893 disclosed that a gas occluded in a sugar mass would remain occluded inside the mass. However, this patent contained no description of the system used for incorporation of the gas into the fused sugar mass. U.S. Pat. Nos. 3,985,909; 3,985,910 and 4,001,457 relate to methods for the obtention of a gasified candy mass. However, neither U.S. Pat. No. 3,985,910 or U.S. Pat. No. 4,001,457 disclose any gasification method. U.S. Pat. No. 3,985,909 and Spanish patent No. 480,775 of the applicants of the present invention, offered a description of how to realize the incorporation of gas into a mass of fused sugars.

In gasifying a candy, the method used to carry out the incorporation of the gas into the fused sugar is important to the quality of the product produced. By means of the technique described in U.S. Pat. No. 3,985,909, the incorporation of the gas into the hot candy melt or mass of fused sugars is effected with the help of a special shaft with paddle blades attached to it (FIG. 1): "The gas with the head space enters the hollow shaft at the head space level and exits at the bottom of the shaft, being dispersed within the melt by the rotation of the paddle blades". Thus, the gas is introduced into the empty headspace over the melt and as a result of the rotation of the shaft the gas enters the head entrance of the hollow shaft and exits at the bottom of the shaft (FIG. 2). According to this patent, the system used to gasify the hot melt is based upon gas circulation inside the hollow shaft due to the vacuum created by rotation. The system described in U.S. Pat. No. 3,985,909 has demonstrated difficulties in commercial applications. Attempts to employ this system on an industrial scale, using 500 to 1,000 liter pressure vessel and their corresponding agitators, show that the specific weight and viscosity of the hot melt stops the gas circulation into the sugar mass because the vacuum created is insufficient to overcome the weight of the candy column having a typical specific weight of 1.38 g/ml. Also, after several production runs, the candy mass will slowly proceed to obscure the openings for gas circulation, this requires the openings to be cleaned after each production run wasting time which adversely affects the cost of the finished product. For this reason, the previously described system is undesirable on an industrial scale. Upon introduction of the fused sugar mass into the pressure vessel of the prior art, the hot melt enters the shaft through the gas outlets and goes up inside the hollow rotary shaft. When the shaft starts its rotation, the agitator and also the plate should be emptied of candy mass. However, typically large quantities of candy mass remain stuck to the inner walls of both the agitator b and plate a due to the density and the viscosity of the fused sugar mass. For this reason, the openings for recirculation of the gas slowly become obstructed, even in cases where the equipment is initially cleaned. For this reason, the sugar mass is not gasified sufficiently. In order, to produce the gas circulation of the prior art, the vacuum created by the agitation must be superior to the pressure head of the column h-a (FIG. 2) of candy. At best, this is only possible if the value h-a, is very small and thus the productions must typically be small. Therefore, no maximum use can be made of the pressure vessel's capacity, where the apparatus is one of the most expensive components used in the process. Also, the finished product shows a large quantity of candy dust with a diameter inferior to 1 mm. This candy dust is not commercially acceptable as its popping and crackling sounds are not strong enough. The prior art gasified methods are rendered commercially unacceptable due to the fact that the candy mass has a high viscosity and a typical density of 1.38 g/ml which hampers the gas dispersion within the mass. The size of the bubbles can not be altered as this is constant depending upon the characteristics of the apparatus employed.

The method described in Spanish patent no. 480,775, by the applicants of the present invention, tried to solve the aforementioned problems by means of a porous plate having several openings of a predetermined diameter formed from agglomerated glass. The plate was placed at the bottom of the pressure vessel in such a way that the incorporation of the gas into the candy mass is affected like a "shower" through the mass of hot melt. The prior art system was improved by this method, although the obstruction of the small pores or inlets of the plate by the hot melt was not avoided. Moreover, due to the differential pressure. created, the glass plate could break when its pores became fully obstructed. In cases where the bubbles were very large, they often emerged at the surface of the sugar mass and the sugar mass was not sufficiently gasified. When the bubbles were very small, showing a diameter inferior to 0.01 mm, the popping or crackling sounds have a low intensity or even are inaudible. Therefore, both situations should be avoided.

SUMMARY OF THE INVENTION

The process of the present invention presents a series of innovations in order to take advantage of the total capacity of the pressure vessel used, thus reducing the cost per kilogram of finished product in that the same number of personnel and equipment can achieve larger production runs. The present invention relates to the incorporation of a gas through a bubble forming device of a fluid bed, placed at the bottom of a cylindrical pressure vessel, just below an agitator. Thus, the gas retained by the lid of the forming device is incorporated into the candy mass as a fine curtain of bubbles, and the path covered by the traveling bubbles inside the pressure vessel will be as long as possible. The device for forming the gas bubbles of the fluid bed has a special design in order to avoid obstruction of the gas outlets. By means of springs, a lid is fixed to a body such that the opening between the lid and the body remains closed when the hot melt is placed into the pressure vessel. Therefore, the opening can not become obstructed. Once the pressure vessel is completely filled with sugar mass, the incorporation of gas into the mass will start by incorporation of a gas through an inlet. The separation between the lid and the body is not opened until sufficient pressure is reached at the inlet to overcome the weight of the candy column above the lid and the force of the springs that bias the lid to the body. This superpressure at the gas inlet prevents the gas outlet from becoming obstructed due to the entrance of fused sugar mass into the gas outlet. When the introduction of gas is halted, the opening or gap between the lid and the body is closed due to the weight of the candy mass above the lid and the action of the springs joining the lid to the body. The incorporation of gas into the candy mass is effected as slowly as possible and just below the agitator. During the period of gas incorporation, agitation is continued in order to break and disperse the bubbles within the entire fused sugar mass or fused mixture of sugars (homogenization). By means of recirculation of the gas, the incorporation may last as long as deemed necessary, and even after the maximum pressure for performance has been reached.

The aforementioned difficulties of the prior art can be avoided by the process of the present invention. More precisely, the present invention provides a process for gasifying a fused sugar mass through recirculation of a gas within the process for obtention of gasified candies. The pressured gas contained in the headspace of a pressure vessel is withdrawn by a circulation pump, compressed and liquefied by a gas recompression unit and after gasification is subsequentially incorporated into a candy mass as a fine curtain through the lower level of a pressure vessel below the agitator. A bubble forming device retains the gas and divides and disperses the gas homogenously in order to obtain bubbles with a very similar diameter and of a predetermined size. The opening of the gas inlet into the pressure vessel is only opened during gas circulation to avoid obstruction by the candy mass.

BRIEF DESCRIPTION OF THE DRAWINGS

FIG. 1 is a side cross-sectional view of a prior art gasification system.

FIG. 2 is an enlarged cross-sectional view of the gasification system of FIG. 1.

FIG. 3 is a cross-sectional schematic representation of the gasification system of the present invention.

DETAILED DESCRIPTION OF THE PREFERRED EMBODIMENT

Figure 4:
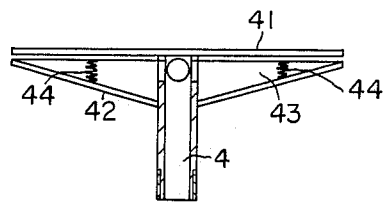
FIG. 4 is a side cross-sectional view of the fluid bed gas molder of the present invention.
Figure 5:
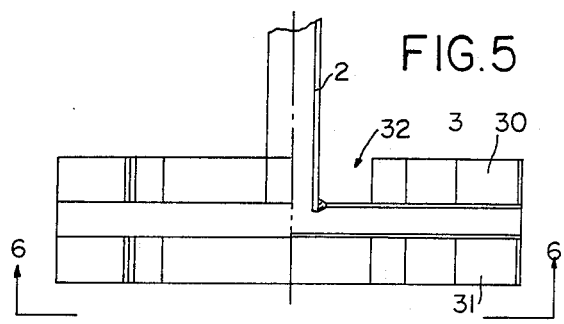
FIG. 5 is a side cross-sectional view of the agitator of the present invention.

The equipment used in the method of the present invention consists of a sucking, recompression and recirculation pump RCV which is connected to gas stream 6 from the head space level A of a pressure vessel I. The head space level A is occupied by a gas under pressure created by means of the recompression unit RCV. Recompression unit RCV feeds pressurized ga stream 7 into the bottom space of the pressure vessel C below agitator 3, within the fused candy mass C. The bubble forming device, FIG. 4, of the present invention which creates a fluid gas bed, has been specially designed to allow the gas from inlet 4, below agitator 3 to fall upon lid 41 which will retain the gas. Springs 44 bias lid 41 to body 42 which is connected to gas inlet 4. Thus, the opening lid 41 and body 42 remains closed when the pressure vessel 1 is charged with a hot melt C. Once the pressure vessel is completely filled with a sugar mass C, recompression unit RCV is activated and gas will flow through inlet 4 into the chamber 43 between lid 41 and body 42. Lid 41 does not open until the pressure at inlet 4 has reached a sufficient pressure to overcome the weight of the candy column over the lid 41 and the force of the springs 44 that bias the lid 41 toward body 42. When the pressure at inlet 4 is sufficient to separate lid 41 from body 42, gas which escapes between lid 41 and body 42 impinges upon the blades 31 of agitator 32. The gas bubbles which hit the blades 31 are thus cut and dispersed within the hot melt. While cutting and dispersing bubbles within the hot melt, the agitator 32 gasifies the fluid hot melt and bubbles of a substantially uniform diameter (homogeneity). The arms or blades 31 of the agitator 32 are slightly inclined as shown in FIG. 5 to allow both the outlet and cutting of the bubbles.

The action of agitator 32 must be fast enough to create a vortex, which will assist in incorporating the gas into the candy mass. The method of the present invention provides for a uniform size of bubbles such that upon decompression and discharge of the finished product, the quantity of candy dust not acceptable for commercial use is diminished considerably. Generally the waste product for the present invention ranges between 15 to 20% as opposed to 30 to 35% of the prior art. The desirable vortex is produced by the upper blades 30 of agitator 32.

The finished product of the present invention preferably provides a minimum of 10 to 12 popping or crackling sounds per gram of candy having an intensity superior to 3 decibels. Popping and crackling sounds of the gasified candy depend upon a combination of the following factors: 1.diameter of the bubbles, 2.pressure inside the bubbles, 3.number of bubbles per gram of candy, 4.surface tension of the wall of the bubbles, 5.composition of the fused sugar mass, 6.granulometric values of the candy pieces. For each factor, there are optimal values and the best results logically are obtained by attempting to approach the optimal values for each factor. Warmth will negatively affect the product, upon a temperature rise, the force of the surface tension of the bubbles' walls diminishes, liberating the gas occluded therein. This will typically occur at a temperature of between 40° to 55° C. Once the finished product has been exposed to such temperatures, the occluded gas will be partially liberated and the candy will lose some or all of its typical popping characteristics and is converted into a porous hard candy with a density of approximately 0.3 g/ml. The quantity of gas occluded per gram of product candy is not a decisive factor for the intensity and quantity of popping sounds that can be perceived after introduction of candy into the mouth.

DIAMETER OF THE BUBBLES

In order to obtain a high quality candy with a maximum number of popping sounds, the most important factor is the method of gasifying the sugar mass while in a liquid phase. The size of particles and pieces will principally depend upon the control of the size of the bubbles. Gasification with the hot melt can be affected by a number of means. First, incorporation of a gas by means of simple bubbling. The relationship between the size of the orifice and the size of the bubbles produced (DB) depends upon the properties of the system employed, for example given the interfacial cut of the gas/liquid pellicle ($\sigma$), density of the liquid ($\tau$liquid), density of the gas ($\tau$gas), gravitational acceleration g and DB (diameter of the bubbles). The diameter of the bubbles is inferior to that of the orifice when:

$$DB > 0.078 \sqrt{\sigma/\rho \text{ liquid } - \rho \text{ gas}}.$$

The diameter of the bubbles is superior to the orifice when:

$$DB < 0.078 \sqrt{\sigma/\rho \text{ liquid } - \rho \text{ gas}}.$$

Due to the high viscosity of the fused sugar mass and its typical specific weight of 1.38 g/ml, the bubbles will not follow the above mentioned equations and will be considerably larger, which makes any control of their size more difficult in a system of gas incorporation through simple bubbling.

Figure 6:
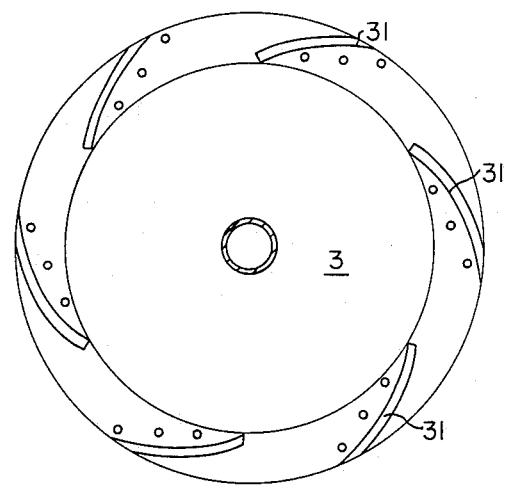
FIG. 6 is bottom view of the agitator along line 6—6 of FIG. 5.

A second method comprises incorporation of a gas by a stream or current. At an orifice, a turbulence is created if the speed is increased continuously, and the stream of gas is similar to a continuous stream of large and irregular sized bubbles with varying movements that will split at approximately 7 to 11 cm from the outlets' orifice. These large bubbles will split into smaller bubbles, ranging in size from between 0.25 to 1.27 mm if their shape is spherical. However, if the bubbles have a lenticular or cylindrical shape, their diameter will be larger. As $\epsilon$=surface cohesion strength, Pr=pressure inside the bubble, FIG. 6, we find where $\epsilon$>Pr the bubble is stable, where $\epsilon$<Pr the bubble is unstable (it will break by itself) and where $\epsilon$=Pr the bubbles is metastable (will break due to any mechanical accident or shock).

It is important to control the size of the bubbles. Upon liberation of the occluded gas, small bubbles will not reach a popping sound level high enough to meet the minimum degree of audition once the candy piece has been placed in the mouth. The minimum degree of audition is about 0.5 dB, and if the popping sounds are inferior to this value, they will not be audible. In the present case the audition level involved refers to a product that has been introduced into the mouth and therefore is situated near the internal ear so that transmission of the sound is optimal. The audition level does not refer to external sounds, in such a case the minimum degree of audition is higher. The bubbles will not break in a violent manner if their diameter is inferior to 0.3 mm and superior to 0.01 mm and principally if their size is uniform. Thus, the quantity of undesirable candy dust will be lower. The major part of the bubbles have a spherical shape.

If the bubbles are large, the equilibrium proportion that should exist between the force exercised by the pressure inside and outside the bubble is superior to the surface tension of the bubbles' wall. Thus, the bubbles will break, giving way to smaller pieces of candy and the finished products' quality will be lower. In other words, if the bubbles' diameter is superior to 0.3 mm then $\epsilon$<Pr, the internal pressure of the bubbles is superior to the surface cohesion strength. Upon breaking, the bubble will fracture the candy into very small pieces which forms candy dust. The bubbles can have both ellipsoidal or cylindrical shapes. The large quantity of remaining candy dust is an undesirable side product in all of the prior art methods, and is even referred to in some of the prior art descriptions.

Figure 7:
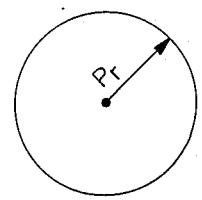
FIG. 7 is a representation of a gas bubble as formed by the present invention.

The preferred products' quality is based upon the number of popping sounds of intensity superior to 2 to 3 decibels. On one hand the intensity of the popping sound must be audible to the person consuming the candy, and on the other hand the candy pieces should have more than 10 popping or crackling sounds having an intensity superior to 2 to 3 decibels (dB) per gram of gasified candy regardless of the amount of gas occluded per gram of candy. The more popping or crackling sounds the product produces, the higher will be its quality. The candy pieces having a mesh size inferior to 1.0 mm and bubbles of a diameter inferior to 0.01 mm will emit a large quantity of small popping sounds similar to fizzing. However, the intensity of the popping sounds varies between 0 and 1.5 decibels and in spite of the slight fizzing sound and the same quantity of gas occluded per gram of candy, such a product does not have the necessary characteristics for commercialization. FIG. 7 is a graph of decibels verses time analyzing the popping and crackling sounds of such a product having 3 ml/gr of occluded gas.

Figure 8:
FIG. 8 is a graphical analysis of the quantity and intensity of sounds emitted by a gasified candy sample.

FIG. 8 is a graphical analysis of a product also having 3 ml/gram of occluded gas and a mesh size between 1 and 4.5 mm and bubbles of a diameter between 0.3. and 0.01 mm. Such candy pieces are of top quality due to the number and intensity of their popping and crackling sounds.

Figure 9:
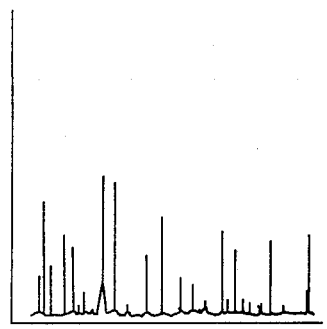
FIG. 9 is a graphical analysis of the quantity and intensity of sounds emitted by a gasified candy sample.
Figure 10:
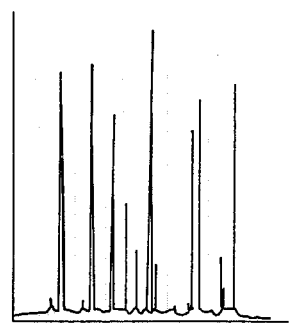
FIG. 10 is a graphical analysis of the quantity and intensity of sounds emitted by a gasified candy sample.
Figure 11:
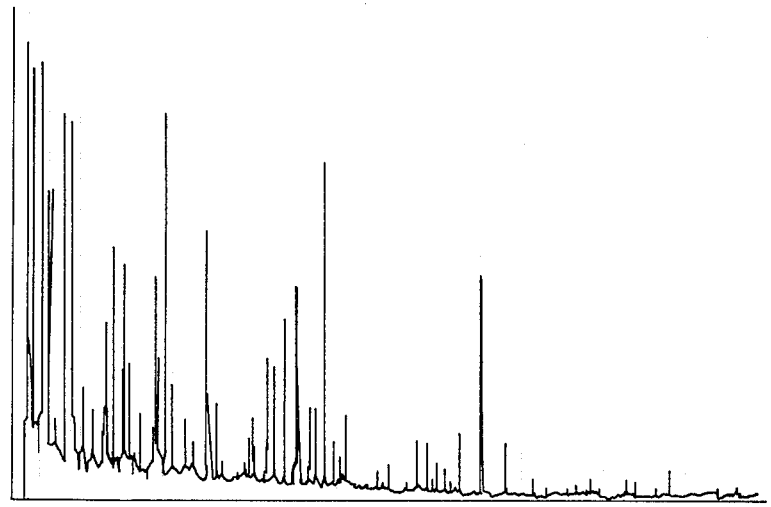
FIG. 11 is a graphical analysis of the quantity and intensity of sounds emitted by a gasified candy.

Candy pieces with a mesh size superior to 4.5 mm are not desirable for consumption, as besides the normal popping sounds they create explosions and are fractured into multiple smaller pieces. This mechanism of action is due to the enclosure of bubbles with diameters superior to 0.4 mm in a metastable phase that easily explode because of any mechanical or thermal action. FIG. 9 is a graph of decibels verses time for an analysis of such a product showing a number of "explosive" sounds.

From the details set forth above, it can easily be seen it is important to maintain minimum quantity of product with a mesh size inferior to 1.0 mm, as such a product is undesirable for commercial purposes. The present invention achieves an important uniformity of bubble size, therefore breakage of the candy mass is more uniform and the quantity of candy pieces with a mesh size inferior to 1 mm is considerably reduced.

A candy mass gasified with high pressure carbon dioxide can be released from the pressure vessel as soon as it has been cooled to a temperature between 5 and 10° C. The cooled candy mass can not be released from the vessel without taking advantage of the fact that it will fracture into multiple pieces of all sizes upon decompression. When decompressing the cooled candy mass, a critical moment exists when the candy mass will break into multiple pieces. Fracture of the candy mass will start at a supra atmospheric pressure of between 10 and 15 atmospheres. At this pressure, the differential between internal and exterior pressure of the bubbles overcomes the surface tension strength of the bubbles.

It should be emphasized that both development and study of the differing parameters and conclusions disclosed in the present application have been possible thanks to the development of a specific method of testing samples of gasified candy developed by the present applicants. The method of the present invention has been described with respect to parameters of a gasified candy determined by an apparatus which detects and records graphically the number intensity, frequency, average and accumulated value of the popping and crackling sounds emitted by a gasified candy mass under ambient conditions similar to a child putting the gasified piece of candy into the mouth. Heretofore, disclosures regarding the gasification of a candy only mentioned the quantity of gas, in milliliters, occluded per gram of product in order to distinguish the quality of the product. The present applicants have determined that such a measurement does not provide an accurate determination of the properties of gasified candy. The quality of the finished product depends upon the intensity and number of popping and crackling sounds; not solely upon the quantity of gas occluded per gram of product. FIGS. 7 and 8 are graphs of decibels versus time for products prepared in a single manufacturer both having approximately 3 ml of gas occluded per gram. However, the smaller pieces which include smaller bubbles (FIG. 7) only make a fizzing while the larger pieces, including larger occluded bubbles make a characteristic popping and crackling sound. Thus, it is clear that a method of producing a gasified candy which merely provides for control of the volume of gas occluded per volume of candy does not necessarily provide for the production of a commercially desirable product.

The present invention provides a method of producing a gasified candy which controls not only the volume of gas occluded per volume of candy but also the size of the bubbles so that the value of the popping and crackling omitted by the gas by the candy are within a commercially acceptable range.

We claim:

1. An apparatus for incorporating gas under pressure into a fused sugar mass comprising:
   a pressure vessel for containing a fused candy mass, said vessel having an interior oriented to have a top region and a bottom region;
   an agitator disposed within said interior; and
   a bubble forming means for introducing compressed gas into said fused sugar mass as a curtain of gas bubbles, said bubble forming means being disposed within the bottom region of the pressure vessel below said agitator, wherein said bubble forming means comprises a lid situated over a nozzle of a gas inlet within a base so as to retain the compressed gas slightly, to reduce the speed of incorporation of the compressed gas, and to dispense the compressed gas as a curtain of gas bubbles below the agitator.

2. An apparatus according to claim 1 wherein said lid is biasably positioned against said base of said bubble forming means such that said lid prevents the release of gas bubbles in the absence of sufficient pressure from compressed gas emitted from said gas inlet to create an opening between said lid and said base thereby preventing obstruction of said gas inlet by said fused sugar mass.

3. An apparatus according to claim 1, wherein said agitator comprises a means for cutting and dispersing gas bubbles introduced into said fused sugar mass.

4. An apparatus according to claim 2, wherein said agitator comprises a means for cutting and dispersing gas bubbles introduced into said fused sugar mass.

5. An apparatus according to claim 1 wherein said apparatus further comprises a means for circulating gas from the top region of the pressure vessel interior to the bubble forming means.

6. An apparatus according to claim 2 wherein said apparatus further comprises a means for circulating gas from the top region of the pressure vessel interior to the bubble forming means.

7. An apparatus according to claim 3 wherein said apparatus further comprises a means for circulating gas from the top region of the pressure vessel interior to the bubble forming means.

8. An apparatus according to claim 4 wherein said apparatus further comprises a means for circulating gas from the top region of the pressure vessel interior to the bubble forming means.

9. An apparatus according to claim 5 wherein said gas circulating means comprises a means for compressing gas being circulated from the to region of the pressure vessel interior to the bubble forming means.

10. An apparatus according to claim 6 wherein said gas circulating means comprises a means for compressing gas being circulated from the top region of the pressure vessel interior to the bubble forming means.

11. An apparatus according to claim 7 wherein said gas circulating means comprises a means for compressing gas being circulated from the top region of the pressure vessel interior to the bubble forming means.

12. An apparatus according to claim 8 wherein said gas circulating means comprises a means for compressing gas being circulated from the top region of the pressure vessel interior to to the bubble forming means.

* * * * *